S. W. BROTHERS.
LOCKING CHUCK FOR ROCK DRILLS, &c.
APPLICATION FILED FEB. 24, 1913.
1,075,325.
Patented Oct. 14, 1913.
2 SHEETS—SHEET 2.
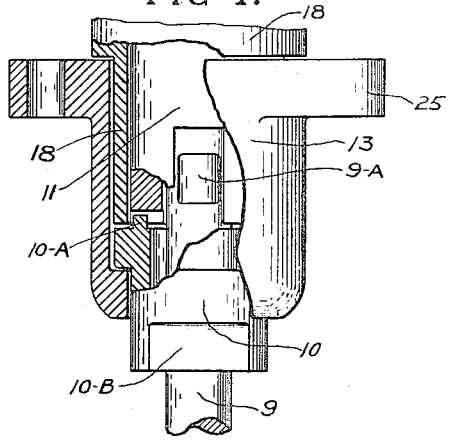
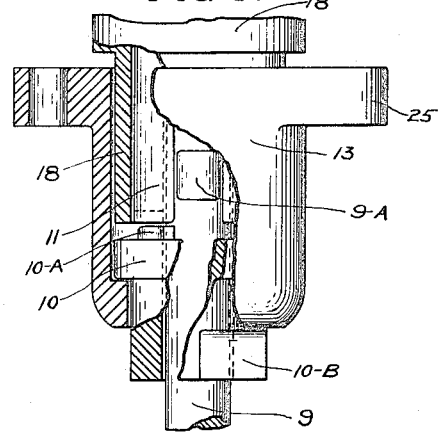
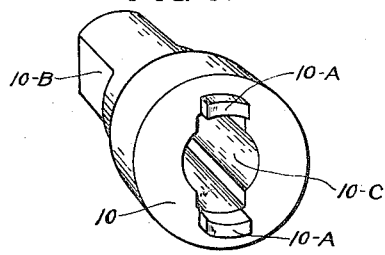
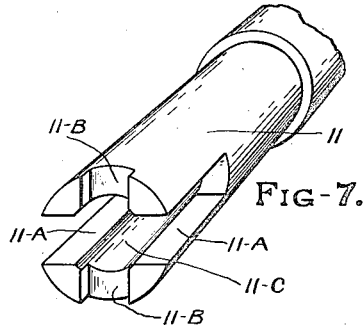
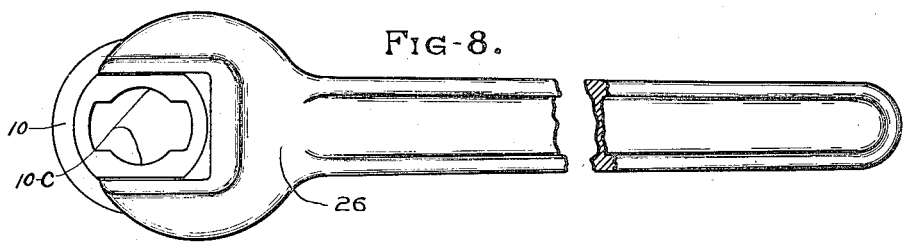
WITNESSES:
Halbert Brown.
Herman Johnson
INVENTOR.
SANFORD W. BROTHERS
BY
Church + Church
his ATTORNEYS S. W. BROTHERS.
LOCKING CHUCK FOR ROCK DRILLS, &c.
APPLICATION FILED FEB. 24, 1913.

1,075,325.

Patented Oct. 14, 1913.

2 SHEETS—SHEET 1.

WITNESSES:
Halbert Browne,
Herman Johnson

INVENTOR.
SANFORD W. BROTHERS.
BY
Church & Church
his ATTORNEYS

UNITED STATES PATENT OFFICE.

SANFORD W. BROTHERS, OF DENVER, COLORADO.

LOCKING-CHUCK FOR ROCK-DRILLS, &c.

1,075,325.

Specification of Letters Patent.

Patented Oct. 14, 1913.

Application filed February 24, 1913. Serial No. 750,273.

*To all whom it may concern:*

Be it known that I, SANFORD W. BROTHERS, a citizen of the United States, and resident of Denver, in the county of Denver and State of Colorado, have invented certain new and useful Improvements in Locking-Chucks for Rock-Drills, &c.; and I do hereby declare the following to be a full, clear, and exact description of the same, reference being had to the accompanying drawings, forming part of this specification, and to the figures and letters of reference marked thereon.

This invention relates to chucks particularly designed for use with power driven rock drills in which a hammer blow is delivered on the end of the drill bit held in the chuck.

The objects of the invention are to provide a simple chuck composed of few parts and of such character as to successfully resist the strains to which the chuck is subjected in the rough use for which instruments of this kind are designed and at the same time provide for the quick and easy removal of the drill and the insertion of a new drill as required.

A further object of the invention is to provide a drill chuck with which the drill is given a freedom for rebound and with which injurious results due to an overstroke or blow of the hammer on the front head will be overcome or neutralized in such wise as to prevent injury to the machine or the chuck members.

Figure 1:
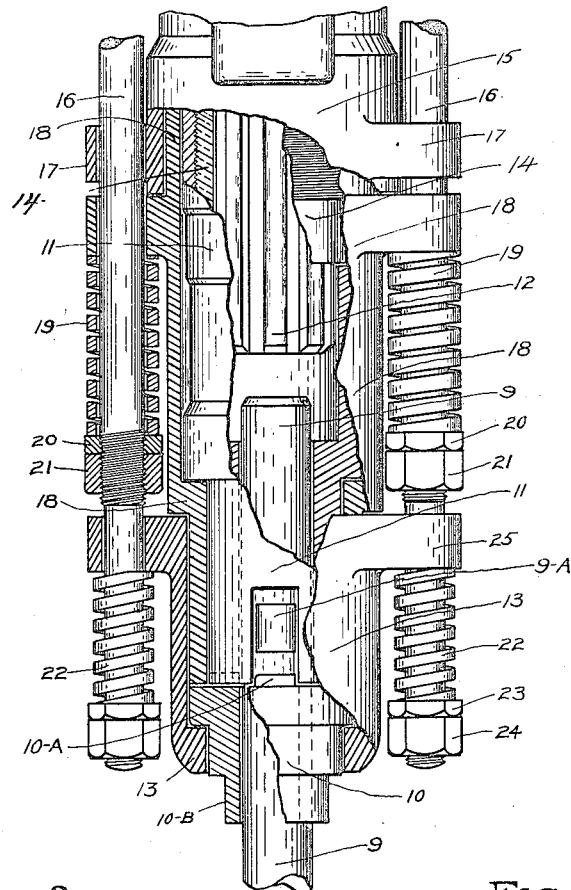
Figure 2:
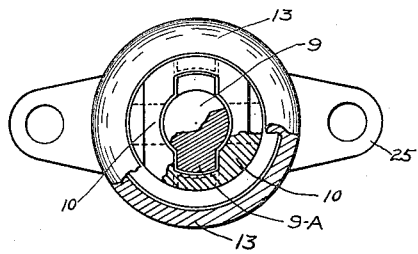
Figure 3:
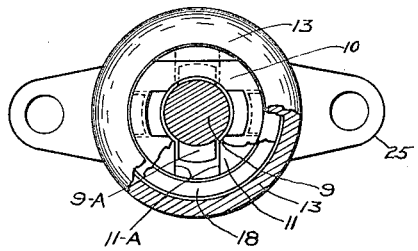

Referring to the accompanying drawings,—Figure 1 is a sectional elevation of the front end of a drill embodying a chuck constructed in accordance with the present invention, the parts in section being broken away on irregular lines, whereby the contour, as well as the internal construction, is shown. Fig. 2 is an end elevation of the outer chuck and head members shown in Fig. 1, with parts in section, and the drill mounted therein in unlocked position. Fig. 3 is a similar view with the drill in locked position. Fig. 4 is a sectional elevation of the chuck and outer head members, showing the position of the chuck members when the drill is locked therein. Fig. 5 is a similar view showing one position of the outer chuck member during its movement from the unlocked to the locked position. In other words, the parts in this view are shown with the locking member of the chuck in an intermediate position. Fig. 6 is a perspective view of the outer or locking member of the chuck. Fig. 7 is a perspective view of a portion of the sleeve or inner drill head receiving chuck member. Fig. 8 is an end elevation of the chuck member shown in Fig. 6 with a wrench in position for turning the same into locked or unlocked position.

Similar reference numbers in the several views indicate the same parts.

In illustrating the present invention it has been thought necessary to show only the front end of a rock drill cylinder, it being understood that the cylinder and parts for operating the piston hammer therein are of any ordinary or preferred construction adapted to deliver a succession of blows on the head or inner end of the drill bit indicated at 9. The lower end of the cylinder is indicated at 15 and it is adapted to receive the piston, the nose or hammer end of which is indicated at 12 in the drawings. In the particular construction illustrated the cylinder is provided with lateral lugs 17 through which rods 16 pass for holding the parts together; thus the said rods 16 are adapted to receive the transverse ears or lugs of the inner head 18 and to retain the same in position on the cylinder with a yielding pressure. For this purpose the head 18 is adapted to slide longitudinally on the rods 16, but is normally held in the position shown in Fig. 1 by coil springs 19 surrounding the rods in front of the lugs on the head and adapted to be adjusted by adjusting and lock nuts 20 and 21, respectively, threaded on the rods in front of the springs. In view of the well known construction of drills of this type it is thought unnecessary to show the entire drill, but simply so much as to present the proper application of the improvement herein described, it being understood that the longitudinal rods 16 are carried through lugs located at the upper end of the drill casing and rigidly secured thereto, holding the lower chuck members in normal position, as shown in Fig. 1.

Mounted on the front end of the head member 18 is an over-sleeve or outer head member 13 also having lugs 25 through which the reduced ends of the rods 16 pass, whereby the said member 13 is permitted a longitudinal movement on the rods and member 18 for a purpose which will be presently shown. The over-sleeve or outer head 13 is held inwardly with a yielding pressure by coil springs 22 surrounding the rods 16 and adapted to be adjusted and held in adjusted position by adjusting and lock nuts 23 and 24, respectively.

Within the head member 18 there is mounted, so as to be capable of rotation, an inner chuck member 11, which, at its rear end, is adapted to receive the nose 12 of the piston hammer and at its forward end to receive the head or end of the drill, and through which rotary motion is imparted to the drill. Ordinary means may be employed for rotating the inner chuck member intermittently, and as shown said member is provided with an internal sleeve 14 preferably threaded into the same from the rear end and itself having internal grooves for coöperating with ribs on the nose of the piston hammer 12. With this arrangement rotation imparted to the piston hammer will be communicated to the inner chuck member and at the same time the piston hammer will be left free to reciprocate independently and to deliver successive blows upon the inner end of the drill.

The drill is provided with lateral lugs or projections $9^A$ which, when the drill is in position in the inner chuck member, are received in transverse enlargements or slots $11^A$ extending laterally from the opening $11^C$ in which the drill is held, whereby the drill is permitted a limited free longitudinal movement, but any rotary movement of the inner chuck member is directly communicated thereto through the lugs and slot-connections described.

For holding the drill in place with the greatest possible security and at the same time permitting of its ready removal and replacement when occasion demands, an outer chuck member 10 is mounted in line with the inner chuck member 11 and adapted to be held between the outer head 13 and the inner head 18, as will be readily understood from an inspection of Figs. 1, 4 and 5. The aperture through the outer chuck member 10 is shaped to correspond to the transverse contour of the drill shank and lugs $9^A$, whereby when the outer chuck member is positioned with the transverse enlargements registering with the ends of the enlargements or slots $11^A$, the drill head may be readily inserted or removed, but if said outer chuck member be given a quarter turn, so as to bring transverse enlargements of its aperture out of registry with the slots $11^A$, the lugs $10^A$ will be retained within the slots $11^B$ and the drill will consequently be retained in the chuck. Conveniently, the outer chuck member is held in its proper relation to the inner chuck member by locking projections $10^A$ which are adapted to enter either the lower ends of the slots or enlargements $11^A$ or the recesses $11^B$ in the lower end of the inner chuck member. The recesses $11^B$ and slots $11^A$ are offset angularly 90° with relation to each other, and consequently a quarter turn of the outer chuck member in one direction or the other will bring the enlargements of its aperture into line with the slots $11^A$ or at right angles thereto, as the case may be, so as to lock or release the drill as desired. The springs 22 serve to hold the outer chuck member inwardly with a yielding pressure, whereby the locking projections $10^A$ will be retained in said recesses or slots and as a convenient means whereby the said outer chuck member may be rotated for locking or releasing the drill, its forwardly projecting nose piece or end $10^B$ is shaped for the application of a wrench or turning instrument such as indicated at 26 in Fig. 8.

The operation of the device will be readily understood from the drawings, wherein Fig. 2 shows the outer chuck member in the position occupied by it when the drill is being inserted, while Fig. 3 shows the same parts after the drill is inserted and the outer chuck member has been given a quarter turn. Fig. 4 shows the position of the parts with the outer chuck member in locked position, as in Fig. 3, and Fig. 5 shows the position assumed by the parts when the outer chuck member has been drawn forwardly by the passage of the locking lugs $10^A$ out of the slots or recesses and during their transit from one position to the other.

Owing to the fact that the outer or locking chuck member is locked to the inner rotary chuck member, the two members partake of the same rotary motion during the operation of the drill and consequently there is little or no danger of the parts becoming relatively displaced so as to release the drill and there is no liability of any of the parts becoming jammed or sticking so as to interfere with their ready and successful operation either as a chuck which may be locked or unlocked at will, or as parts of the drill mechanism, whereby the drill is loosely held for the direct impact of the hammer and rotated intermittently in accordance with approved practice.

Having thus described my invention, what I claim and desire to secure by Letters Patent of the United States is:—

1. In a locking chuck for drills, etc., the combination with the cylinder, inner and outer heads, yieldingly supported in relation to each other and in relation to said cylinder, of inner and outer chuck members having alined passages therein for the drill shank and transverse enlargements of said passages for the reception of lugs on the drill shank, and means whereby the inner and outer chuck members may be held with said transverse enlargements out of alinement with each other.

2. In a chuck for rock drills, etc., the combination with the yieldingly supported inner and outer head members one slidably mounted on the other, of an inner chuck member having a drill socket with transverse enlargements and rotatably mounted in the inner head member, an outer chuck member rotatably mounted between the ends of the inner and outer head members and having a drill shank opening therein with transverse enlargements adapted to aline with the transverse enlargements in the inner chuck member, and coöperating lugs and recesses on the proximate faces of the chuck members whereby they are locked in proper relative positions to lock and retain the drill or release the same.

3. In a chuck mechanism for rock drills, the combination with the cylinder, a head yieldingly supported in the end of said cylinder and a supplemental head yieldingly supported on the first mentioned head, of an inner chuck member rotatably mounted within the head and having a drill shank socket extending therethrough said socket having transverse enlargements for the reception of lugs on the drill, and an outer chuck member having an opening therethrough for the drill shank, with transverse enlargements for the passage of said lugs, said outer chuck member being held between the outer ends of the two heads and projecting beyond the same for the application of a wrench, and lugs and recesses on the proximate faces of the inner and outer chuck members for holding said members in definite angular relation to each other for locking or releasing the drill.

4. In a chuck mechanism for rock drills, the combination with a cylinder, inner and outer head members slidably mounted longitudinally with relation to each other, clamping rods and springs for yieldingly retaining said head members independently of each other, of inner and outer chuck members rotatably mounted in the inner and outer head members respectively, said chuck members having alined passages therethrough for the reception of the drill head, said passages having transverse enlargements for the reception of lugs on the drill head, and the proximate faces of the chuck members being provided with locking lugs and recesses for retaining the chuck members in proper angular relation to each other for locking or releasing the drill.

5. In a chuck for rock drills, the combination with longitudinally yielding inner and outer head members, and inner and outer chuck members rotatably mounted in said inner and outer head members and embodying means whereby the drill may be held or released by relative angular movement of the chuck members, of clamping rods having reduced end portions, and springs and adjusting nuts for the inner head member mounted on the portion of the rod of larger diameter, and springs and adjusting nuts for the outer head member mounted on the portions of the rod of the smaller diameter.

6. In a chuck for rock drills, the combination with the cylinder, a head movable toward and from the cylinder, clamping rods and spring for yieldingly holding said head in position on the cylinder, of a chuck member rotatably mounted in said head, and means carried by said chuck member for rotating the drill in unison therewith and independently of the head.

7. In a rock drill, the combination with yieldingly supported inner and outer head members, a locking chuck member held between the outer ends of said head members and free to rotate with relation thereto, said chuck member having a projecting end shaped for the reception of a turning wrench, of an inner chuck member rotatably mounted in the inner head member, said chuck members having alined apertures therethrough for a drill head, and formed with transverse enlargements for the reception of drill head lugs and the inner face of the outer chuck member being provided with locking lugs adapted to enter the transverse enlargements of the apertures of the inner chuck member.

SANFORD W. BROTHERS.

Witnesses:
J. A. WALKER,
G. H. GOULDEN.